W. H. ALLEN.
BRICK HANDLING MACHINE.
APPLICATION FILED MAY 10, 1917.

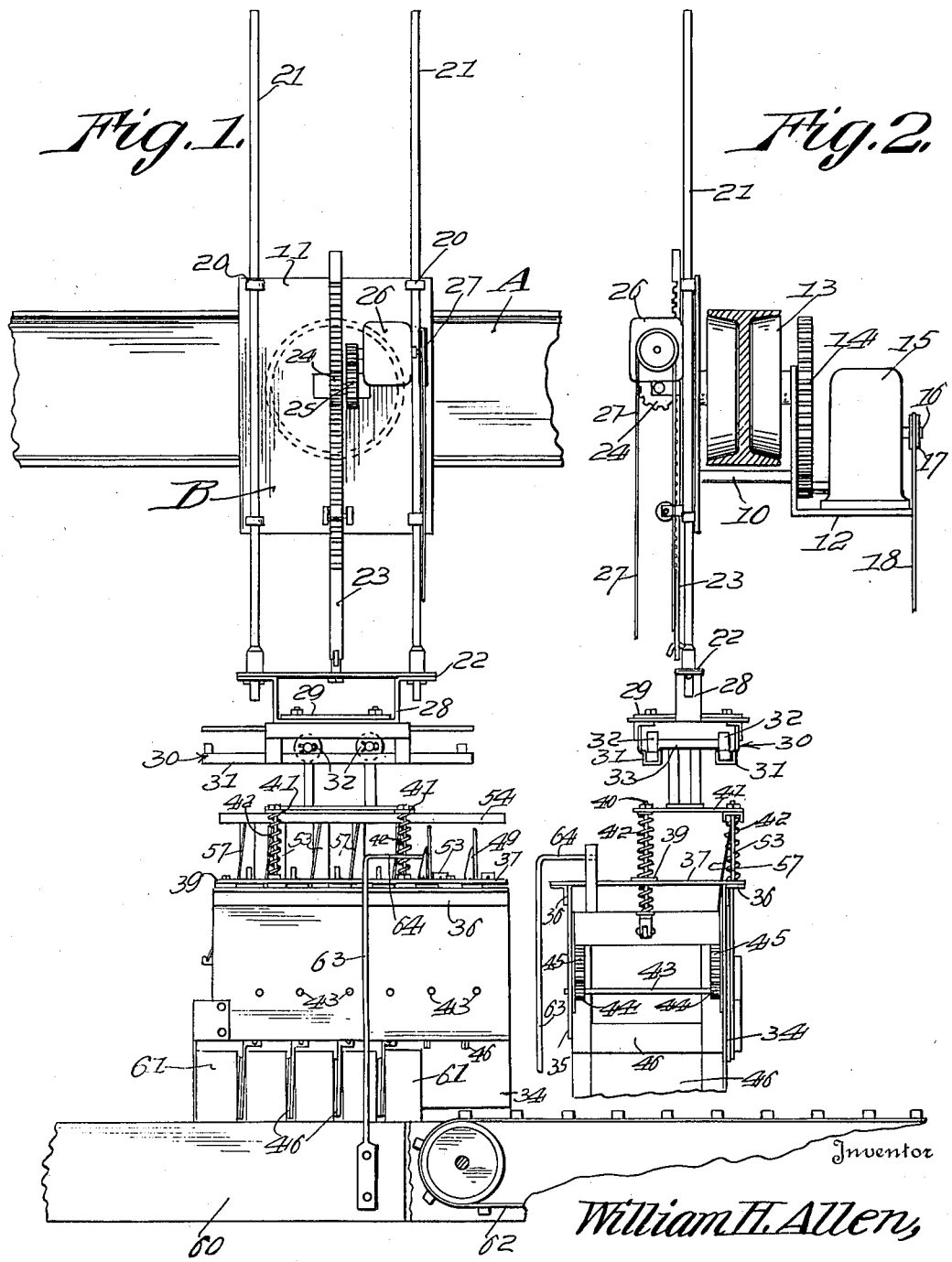

1,280,938.

Patented Oct. 8, 1918.
4 SHEETS—SHEET 2.

Inventor
William H. Allen,

By Talbert & Parker
Attorneys

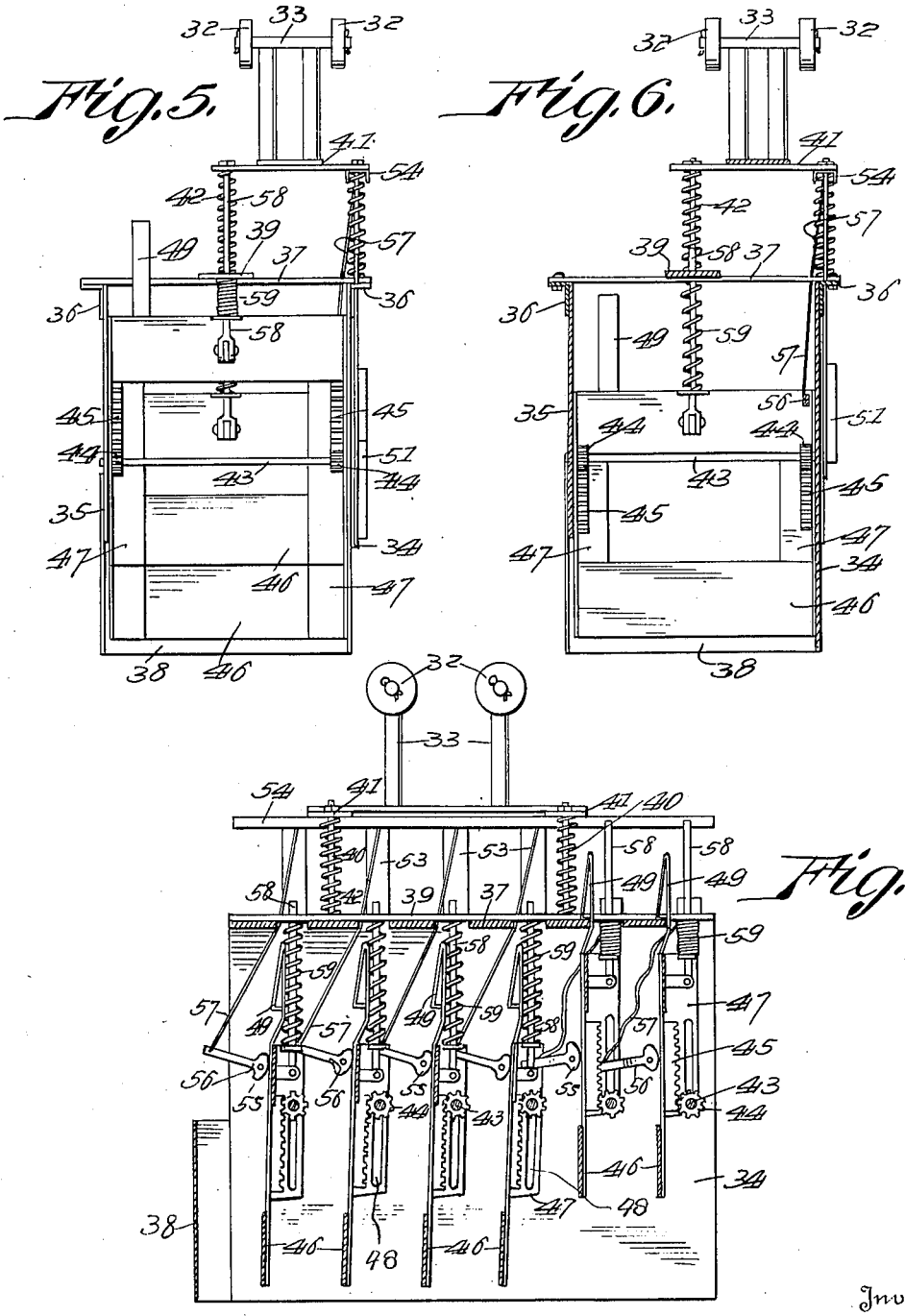

W. H. ALLEN.
BRICK HANDLING MACHINE.
APPLICATION FILED MAY 10, 1917.

1,280,938.

Patented Oct. 8, 1918.
4 SHEETS—SHEET 4.

Inventor
William H. Allen,

By Salbert & Parker
Attorneys

UNITED STATES PATENT OFFICE.

WILLIAM H. ALLEN, OF MOMENCE, ILLINOIS, ASSIGNOR OF ONE-THIRD TO ERNEST A. KRAMER, OF GRANT PARK, ILLINOIS.

BRICK-HANDLING MACHINE.

1,280,938.      Specification of Letters Patent.      Patented Oct. 8, 1918.

Application filed May 10, 1917. Serial No. 167,780.

*To all whom it may concern:*

Be it known that I, WILLIAM H. ALLEN, a citizen of the United States, residing at Momence, in the county of Kankakee and State of Illinois, have invented certain useful Improvements in Brick-Handling Machines, of which the following is a specification, reference being had therein to the accompanying drawing.

The invention relates to a brick handling machine, and more particularly to the class of hacking machines for the transfer of bricks from one point to another.

The primary object of the invention is the provision of a machine of this character wherein a number of bricks delivered to a support from a conveyer will be automatically gripped for the carriage of the same from the support to a point of delivery, thereby eliminating the manual handling of the bricks which results in the chopping and otherwise damaging said bricks.

Another object of the invention is the provision of a machine of this character wherein the clamping means for the bricks is of novel form and automatically controlled so that the bricks can be firmly clamped for the carriage thereof and said bricks are fed singly into the machine from the conveyer receiving the bricks from the press, and such bricks when clamped for the carriage thereof will be prevented from falling from the device during the transportation of the same from the support to the point of delivery.

A further object of the invention is the provision of a machine of this character wherein the same is suspended from a trolley and is movable thereby to the point for the collection of bricks and also to the point of delivery thereof, the machine being of novel formation to assure automatic action thereof in the collecting of the bricks and the delivery of the same.

A still further object of the invention is the provision of a machine of this character which is simple in construction, efficient, positive and reliable in operation and inexpensive in manufacture and installation.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a fragmentary side elevation of an overhead track, the conveyer and trolley for movement on the track, showing the hacking machine constructed in accordance with the invention suspended from the trolley and in position for receiving bricks from the conveyer;

Fig. 2 is a vertical transverse sectional view through the track, showing the hacking machine and trolley in end elevation;

Fig. 5 is a sectional view on the line 5—5 of Fig. 3, looking in the direction of the arrows;

Fig. 6 is a sectional view on the line 6—6 of Fig. 3, looking in the direction of the arrows;

Fig. 7 is a vertical longitudinal sectional view through the hacking machine showing by full and dotted lines the adjusted positions of the clamping members or plates;

Similar reference characters indicate corresponding parts throughout the several views of the drawings.

Figure 3:
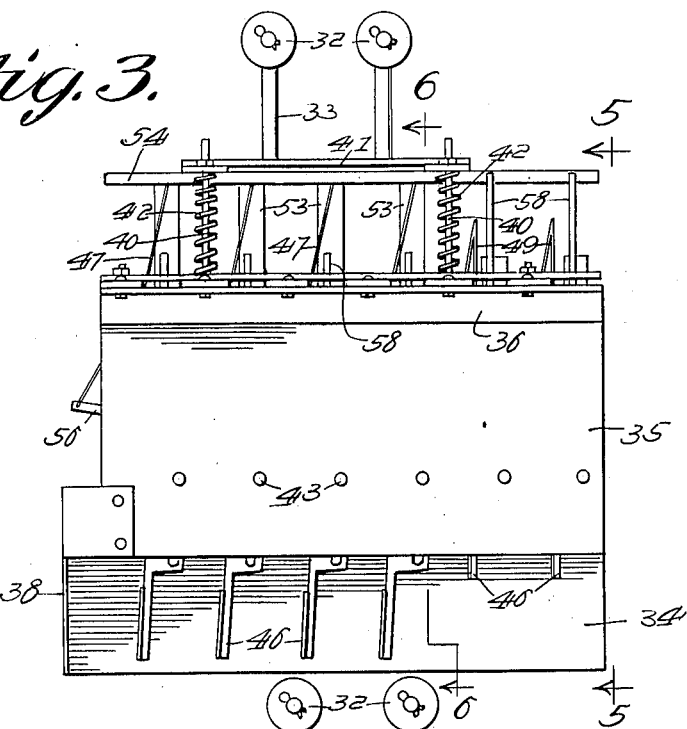
Fig. 3 is an enlarged side elevation of the hacking machine.
Figure 4:
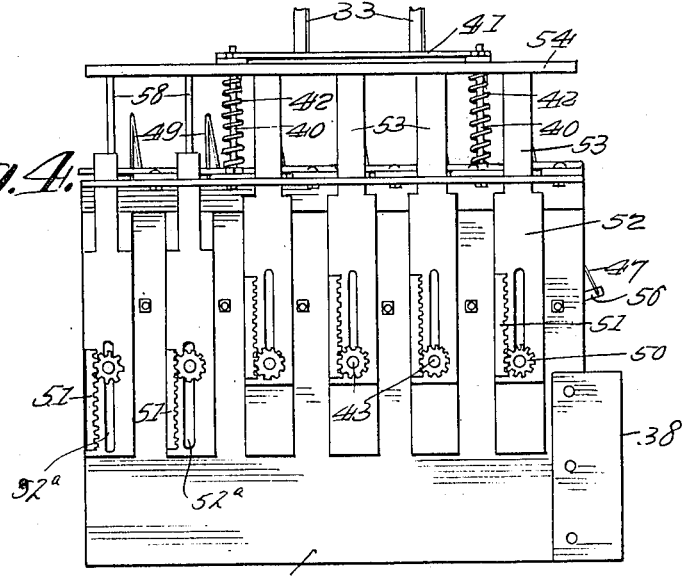
Fig. 4 is a view similar to Fig. 3, looking toward the opposite side thereof.
Figure 8:
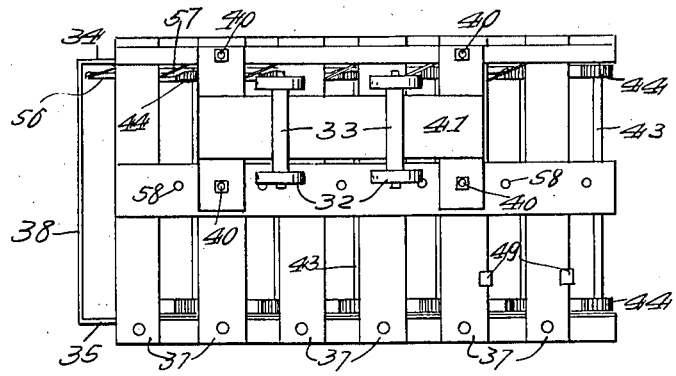
Fig. 8 is a top plan view.
Figure 9:
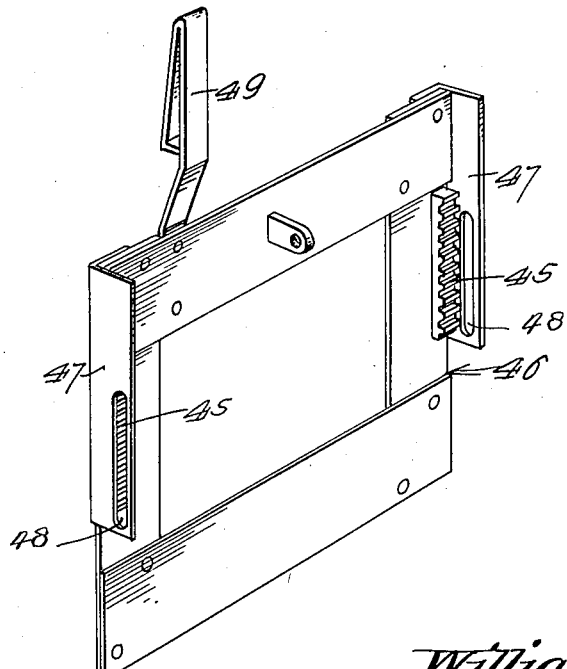
Fig. 9 is a perspective view of one of the clamping members or plates.

Referring to the drawings in detail, A designates a portion of an overhead track which in this instance is in the form of an I-beam and extends horizontally from one point to another, namely, from the receiving point to the delivery point for the bricks. Movable upon this track is a trolley B which may be of any approved form, preferably comprising a main frame 10 forming the supports 11 and 12, respectively, and in this frame is journaled a pair of rollers 13 which engage the flange portions of the track A at opposite sides of the web thereof so that the trolley will travel upon the track, one of the rollers 13 being the drive roller while the other is a guide roller and the journal of the drive roller, through the medium of gearing 14, is operated from a motor 15 which is mounted upon the support 12, and this motor is started and stopped through the medium of the stud 16 supporting a pulley 17 over which is trained a cable 18, the latter being extended in convenient reach of an operator so that on actuating the cable 18 the switch can be turned for the starting and stopping of the motor. Mounted on the support 11 of the frame 10 are guide lugs 20 through which are slidable guide arms 21 of a hanger 22 which is vertically adjustable through the medium of a rack bar 23 meshing with a pinion 24 journaled on the support 11 and having gear connections 25 with a motor 26 which is started and stopped through suitable switch mechanism 27 similar to the switch mechanism of the motor 15 hereinbefore described. The hanger can be raised and lowered on the operation of the motor 26, which is of any approved reversing type and this hanger has suspended therefrom a hacking machine hereinafter fully described.

Fixed to and depending from the hanger is a support 28 on which is mounted a turntable 29 carrying a bridge 30, the latter being formed with tracks 31 in which are movably engaged the rollers or wheels 32 of a truck 33 from which is supported the hacking machine.

The hacking machine comprises a body including spaced parallel side walls 34 and 35, respectively, the wall 34 being of considerably greater depth than the wall 35, and fixed to the outer faces of these walls at the upper edges thereof are angle bars 36 to which are bolted or otherwise secured transversely disposed spaced parallel cross slats 37, while at one end of the body is secured an end piece 38, the variance in the depth of the walls 34 and 35 being such as to provide an open side to the body, and when the latter is brought into position for receiving bricks as is shown in Fig. 1 of the drawings the end piece 38 limits the movement of the first brick to enter the body, and this piece constitutes a stationary end wall for said body.

Fixed longitudinally of the slats 37 intermediate the ends thereof is a guide rail 39 and fixed in certain of said slats 37 at the ends thereof and also fixed to the guide rail 39 are vertical guide posts 40 which slide through cross plates 41 on the truck 33, while surrounding the guide posts 40 are coiled compression springs 42, and in this manner the body of the hacking machine is yieldably supported relative to the truck.

Journaled transversely at intervals within the side walls 34 and 35 of the body are shafts 43 to which are fixed rack gears 44 meshing with racks 45 mounted on vertically slidable clamping plates or frames 46, each being formed with guide wings 47 provided with elongated slots 48 forming a clearance for the shafts 43 in the movement of the plates or frames 46 vertically within the body. On each plate or frame 46 is carried a resilient catch 49 which is adapted for locking engagement with its companion cross slat 37 and in this manner the clamping frames or plates 46 are normally latched in raised position within the body of the hacking machine, the clamping frames or plates 46 being automatically raised in a manner later described.

Fixed to the shafts 43 without the wall 34 are pinions 50 with which mesh racks 51 carried on plunger rods 52 which have elongated clearance slots 52$^a$ for the shafts and which have their upper reduced ends 53 slidable through the angle bar 36 on said wall 34, and these plunger rods, when actuated, serve to automatically raise the clamping frames or plates 46 within the body of the hacking machine. Carried by the truck 33 on the cross plates 41 thereof is a presser rail 54 which acts against the reduced ends 53 of the plunger rods 52 on the locating of the truck 33 relative to the body of the hacking machine, and in this manner the plunger rods 52 are simultaneously moved to lowered position, and through the medium of the racks 51 and gears 50 the shafts 43 are rotated, and in the rotation of the shafts the gears 44 act upon the racks 45 upon the plates or frames 46, thereby raising the frames or plates 46 within the body of the hacking machine, it being understood, of course, that the body is brought to rest when the plunger rods are depressed for the automatic raising of the clamping frames or plates.

Pivotally mounted upon the wall 34 of the body of the hacking machine are locking cams 55 which are formed with levers 56, and to these levers 56 are connected cables 57 which are also connected with the upper ends of the plungers 52 so that on the upward movement of the plungers 52 the connecting mediums 57 will be pulled upon for the rocking of the levers 56 and the cams 55 which engage with the frames or plates 46 to move the same from non-clamping lowered position, shown by certain of the levers in Fig. 7, to clamping position, shown by the remainder of the levers in said Fig. 7 of the drawings, and these frames or plates 46 when in clamping position will grip and hold bricks within the body of the hacking machine for the transfer of such bricks from one point to another.

Connected with each plate or frame 46 near its upper end is a spring supporting pin 58 which works through the guide rail 39, and surrounding this pin 58 is a coiled expansion spring 59 which serves to tension the plate or frame 46 when in raised latched position so that on the tripping of the latch 49 the plate or frame 46 will be automatically moved to lowered position under the tension of the spring 59 acting thereon, and simultaneously with the lowering of the plate or frame 46 the plunger rod 52 is elevated or raised for the automatic resetting of said plate or frame to normal raised position after the release of a brick thereby from within the body of the hacking machine.

In Fig. 1 of the drawings there is shown a support 60 on which are fed the bricks 61 from a belt conveyer 62 so that the hacking machine can receive a load of bricks for the transfer thereof from the support 60 to the point of deposit or delivery thereof. Fixed to the support 60 at one side thereof is a tripping arm 63 which has its end 64 bent into the path of movement of the latches 49 when holding the plates or frames 46 in their normal raised position in the hacking machine, so that said latches will be automatically tripped to allow the automatic lowering of the clamping plates or frames 46 for the loading of the hacking machine with the bricks resting upon the support 60.

In the operation of the hacking machine, assuming that the same has been brought into position by the trolley and the hanger, as shown in Fig. 1 of the drawings, and a single brick has entered the body of said machine, it will contact with the end piece 38 on said body, moving the body the width of a single brick, this being effected by movement of the truck 33 in the bridge 30. On movement of the body the distance of the width of a single brick the trip arm 63 is active upon the catch or latch 49 next thereto, it being of course understood that all of the frames or plates 46 have been automatically raised and latched in their raised position so that the plate or frame 46 next to the brick 61 within the body will be unlatched and the spring 58 will automatically lower said plate and thereafter the next brick enters the body, and this operation is repeated until all of the plates or frames 46 have become lowered within the body.

On the lowering of the clamping plates or frames 46 within the body of the hacking machine the plungers 52 are elevated automatically, and during the raising movement of these plungers the cables 57 are pulled upon, which act on the levers 56 moving the cams 55 against the plates or frames 46, thereby swinging the frames to positive clamping engagement with the bricks within the body of the hacking machine for the holding of the bricks therein so that when the hanger is elevated the desired distance on the trolley B and the motor 15 is started said trolley will convey the hacking machine from the receiving point to the point of discharge or delivery of the bricks. To discharge or deliver the bricks from the body of the hacking machine the motor 26 is started, which lowers the hanger, and simultaneously therewith the truck 33 is lowered, whereby the presser rail 54 will act upon the plungers 52, causing the latter to move downwardly and in the initial movement the cables 57 are slackened which unlocks the cams 55 from the plates or frames 46 and the latter are automatically raised to normal position, thereby freeing the load from the hacking machine. It is of course understood that the body of the hacking machine, during the unloading operation, rests against a fixed part or foundation so as to permit of holding the same immovable while the truck 33 moves downwardly relative to the body of the hacking machine for the automatic releasing action of said hacking machine.

From the foregoing description, taken in connection with the accompanying drawings, the construction and operation of the herein described brick handling machine will be readily apparent and, therefore, a more extended explanation has been omitted.

Having thus described my invention, I claim;

1. A machine of the character described comprising a body forming a brick receiver, a plurality of clamping plates slidably mounted within the body for gripping individual bricks received therein, means for latching the plates in normal raised position within the body, a truck yieldably supporting said body, means actuated by the truck for raising the plates, and means for moving the plates to gripping position and locking the same on the lowering thereof.

2. A machine of the character described comprising a body forming a brick receiver, a plurality of clamping plates slidably mounted within the body for gripping individual bricks received therein, means for latching the plates in normal raised position within the body, a truck yieldably supporting said body, means actuated by the truck for raising the plates, means for moving the plates to gripping position and locking the same on the lowering thereof, and trip means operative upon the plate latching means to automatically free the plates when raised, so that they may be released singly and in successive order.

3. A machine of the character described comprising a body forming a brick receiver, a plurality of clamping plates slidably mounted within the body for gripping individual bricks received therein, means for latching the plates in normal raised position within the body, a truck yieldably supporting said body, means actuated by the truck for raising the plates, means for moving the plates to gripping position and locking the same on the lowering thereof, trip means operative upon the plate latching means to automatically free the plates singly and in successive order when the latter are in the raised position, and a suspended bridge movably supported and having track rails for movably supporting the truck.

4. In a machine of the character described, a body forming a brick receiver, a truck yieldably supporting the body, a plurality of gripping plates arranged in spaced relation to each other and vertically movable within the body, latches on said plates for locking the same in raised position within the body, rotatable shafts journaled within the body, racks on said plates, pinions on said shafts and meshing with the racks for imparting vertical movement to said plates, plungers slidably fitted without the body and actuated by the truck for the displacement of the plungers relative to said body, the plungers being provided with racks, pinions on the shafts meshing with the last named racks for the automatic raising of the plates on displacement of the plungers by the truck, resilient means for automatically lowering the plates on their release by the latches, means for automatically tripping the latches for the release of the plates in successive order, and means for moving the plates in gripping position, said means being controlled by movement of the plungers in one direction.

5. In a machine of the character described, a body forming a brick receiver, a truck yieldably supporting the body, a plurality of gripping plates arranged in spaced relation to each other and vertically movable within the body, latches on said plates for locking the same in raised position within the body, rotatable shafts journaled within the body, racks on said plates, pinions on said shafts and meshing with the racks for imparting vertical movement to said plates, plungers slidably fitted without the body and actuated by the truck for the displacement of the plungers relative to said body, the plungers being provided with racks, pinions on the shafts meshing with the last named racks for the automatic raising of the plates on the displacement of the plungers by the truck, resilient means for automatically lowering the plates on their release by the latches, means for automatically tripping the latches for the release of the plates in successive order, means for moving the plates in gripping position, said means being controlled by movement of the plungers in one direction, and suspension means for the truck.

6. In a machine of the character described, a body forming a brick receiver, a truck yieldably supporting the body, a plurality of gripping plates arranged in spaced relation to each other and vertically movable within the body, latches on said plates for locking the same in raised position within the body, rotatable shafts journaled within the body, racks on said plates, pinions on said shafts and meshing with the racks for imparting vertical movement to said plates, plungers slidably fitted without the body and actuated by the truck for the displacement of the plungers relative to said body, the plungers being provided with racks, pinions on the shafts meshing with the last named racks for the automatic raising of the plates on the displacement of the plungers by the truck, resilient means for automatically lowering the plates on their release by the latches, means for automatically tripping the latches for the release of the plates in successive order, means for moving the plates in gripping position, said means being controlled by movement of the plungers in one direction, and suspension means for the truck, said suspension means having a bridge provided with rails for movably supporting the truck.

7. In a machine of the character described, a body forming a brick receiver, a truck yieldably supporting the body, a plurality of gripping plates arranged in spaced relation to each other and vertically movable within the body, latches on said plates for locking the same in raised position within the body, rotatable shafts journaled within the body, racks on said plates, pinions on said shafts and meshing with the racks for imparting vertical movement to said plates, and plungers slidably fitted without the body and actuated by the truck for the displacement of the plungers relative to said body, the plungers being provided with racks, pinions on the shafts meshing with the last named racks for the automatic raising of the plates on displacement of the plungers by the truck, resilient means for automatically lowering the plates on their release by the latches, means for automatically tripping the latches for the release of the plates in successive order, means for moving the plates in gripping position, said means being controlled by movement of the plungers in one direction, suspension means for the truck, said suspension means having a bridge provided with rails for movably supporting the truck, and means for vertically adjusting the suspension means.

8. In a machine of the character described, a body forming a brick receiver, a truck yieldably supporting the body, a plurality of gripping plates arranged in spaced relation to each other and vertically movable within the body, latches on said plates for locking the same in raised position within the body, rotatable shafts journaled within the body, racks on said plates, pinions on said shafts and meshing with the racks for imparting vertical movement to said plates, plungers slidably fitted without the body and actuated by the truck for the displacement of the plungers relative to said body, the plungers having racks, pinions on the shafts meshing with the last named racks for the automatic raising of the plates on displacement of the plungers by the truck, resilient means for automatically lowering their plates on the release by the latches, means for automatically tripping the latches for the release of the plates in successive order, means for moving the plates in gripping position, said means being controlled by movement of the plungers in one direction, suspension means for the truck, said suspension means having a bridge provided with rails for movably supporting the truck, means for vertically adjusting the suspension means, and means for guiding the plates on the raising and lowering thereof.

In testimony whereof I affix my signature.

WILLIAM H. ALLEN.